(12) United States Patent
Kim et al.

(10) Patent No.: US 8,844,685 B2
(45) Date of Patent: Sep. 30, 2014

(54) BRAKE DISK

(71) Applicants: Hyundai Motor Company, Seoul (KR); Kia Motors Corporation, Seoul (KR); Seohan Industry Co., Ltd., Chungcheongbuk-do (KR)

(72) Inventors: Yoon Cheol Kim, Gyeonggi-do (KR); Jae Young Lee, Gyeonggi-do (KR); Seong Jin Kim, Gyeonggi-do (KR); Jae Min Han, Gyeonggi-do (KR); Kyoung Don Yi, Daegu (KR)

(73) Assignees: Hyundai Motor Company, Seoul (KR); Kia Motors Corporation, Seoul (KR); Seohan Industry Co., Ltd., Chungcheongbuk-do (KR)

( * ) Notice: Subject to any disclaimer, the term of this patent is extended or adjusted under 35 U.S.C. 154(b) by 20 days.

(21) Appl. No.: 13/718,876

(22) Filed: Dec. 18, 2012

(65) Prior Publication Data
US 2014/0041974 A1    Feb. 13, 2014

(30) Foreign Application Priority Data
Aug. 13, 2012    (KR) .......... 10-2012-0088235

(51) Int. Cl.
*F16D 65/12*    (2006.01)

(52) U.S. Cl.
CPC ............ *F16D 65/123* (2013.01); *F16D 85/128* (2013.01)

USPC .................................................. 188/218 XL

(58) Field of Classification Search
USPC ......... 188/17, 18 A, 218 XL, 264 A, 264 AA
See application file for complete search history.

(56) References Cited

U.S. PATENT DOCUMENTS

| | | | | |
|---|---|---|---|---|
| 3,724,625 A | * | 4/1973 | Rohrlack et al. | 192/107 R |
| 4,576,255 A | * | 3/1986 | Mery et al. | 188/71.5 |
| 4,605,103 A | * | 8/1986 | Carre et al. | 188/71.5 |
| 5,360,087 A | * | 11/1994 | Wiebelhaus et al. | 188/218 XL |
| 5,429,214 A | * | 7/1995 | Wiebelhaus et al. | 188/218 XL |
| 2013/0037359 A1 | * | 2/2013 | Kim et al. | 188/218 XL |

* cited by examiner

*Primary Examiner* — Christopher Schwartz
(74) *Attorney, Agent, or Firm* — Edwards Wildman Palmer LLP; Peter F. Corless

(57) ABSTRACT

Disclosed is a brake disk. The brake disk includes a friction part having a coupling aperture within a center thereof and a plurality of recessed portions repeatedly formed at a predetermined interval along an inner circumference of the coupling aperture, in which bevels protrude from inner surfaces of the recessed portions, respectively. The bevels are tapered along upper and lower sides thereof toward protruding centers. The brake disk also includes a hub having a plurality of protrusions inserted into and attached to the recessed portions when coupled to and received in the coupling aperture of the friction part via a cast-bonding method, along a circumference thereof.

12 Claims, 7 Drawing Sheets

BRAKE DISK

CROSS-REFERENCE TO RELATED APPLICATION

This application claims under 35 U.S.C. §119(a) the benefit of Korean Patent Application No. 10-2012-0088235 filed on Aug. 13, 2012, the entire contents of which are incorporated herein by reference.

BACKGROUND (a) Technical Field

The present invention relates to a brake disk in which a friction part and a hub are coupled to each other through a cast-bonding method to improve a coupling force.

(b) Background Art

Brakes are used in vehicles to reduce a speed of a vehicle or bring the vehicle to a stop. Therefore, a braking system is essential in order for a vehicle to operate efficiently. Brakes come in many different forms, e.g., disk brakes, drums, etc. The most common brake in today's vehicles is a disk brake which applies a brake pad to a rotor when the brake is depressed by the driver.

A typical brake disk includes a friction part for generating a braking force through friction with a friction member, and a hub for coupling the brake disk to a vehicle body. However, a gap may be generated between the friction part and the hub or a coupling portion may become damaged, causing noise due to a braking load or an impact from road surface vibration generated while the vehicle is being operated.

Further, in the brake disk, thermal expansion or thermal deformation may be locally generated at the friction portion due to high friction heat generated on a friction surface during a braking operation while reducing braking force. Thus, a disk brake which increases the coupling force between a friction part and a hub, and reduces thermal expansion generated by friction during a braking operation is required.

The items described as the background art are provided just to help understanding of the background of the present invention, and shall not be construed to admit that they correspond to the technologies already known to those skilled in the art to which the present invention pertains.

SUMMARY OF THE DISCLOSURE

The present invention has been made in an effort to solve the above-described problems associated with prior art. An object of the present invention is to provide a brake disk in which a friction part and a hub are coupled to each other through a cast-bonding method and a coupling portion of the friction part and the hub is formed in a specific shape to have an improved durability.

In one aspect, the present invention provides a brake disk that includes: a friction part having a coupling aperture in the center thereof and having a plurality of recessed portions repeatedly formed at a predetermined interval along an inner circumference of the coupling aperture, in which bevels protrude from recessed surfaces and inner side surfaces of the recessed portions, respectively to be tapered at upper and lower sides thereof toward protruding centers thereof; and a hub having a plurality of protrusions inserted into and attached to the recessed portions when coupled to the coupling aperture of the friction part through a cast-bonding method, along a circumference thereof.

In some embodiments, the tapered portions at the upper and lower sides of the bevels may form an angle of not more than 10 degrees but greater than 0 degrees along the y axis, respectively. The insertion portions protruding between each of the plurality of recessed portions may be repeatedly formed at an inner circumference of the coupling aperture, and "steps" or terraces are formed on upper or lower surfaces of the protruding insertion portions. Each of the steps may have a height of not more than 1 mm but greater than 0.

In yet another embodiment, insertion portions protruding between the plurality of recessed portions may be repeatedly formed at an inner circumference of the coupling aperture, and terracing or steps may be formed on upper and lower surfaces of the protruding insertion portions.

In still yet another embodiment, a sum of heights of the steps/terraces formed on the upper and lower surfaces of each of the protruding insertion portions may not be more than 1 mm but greater than 0.

In a further preferred embodiment, insertion portions protruding between the plurality of recessed portions may be repeatedly formed at an inner circumference of the coupling aperture, and ends of the protruding insertion portions are bent toward upper or lower sides to form bending portions. The bending portions may be bent at an angle of 3 to 10 degrees.

In a yet further embodiment, insertion portions protruding between the plurality of recessed portions may be repeatedly formed at an inner circumference of the coupling aperture, and each of extending portions protruding upward and downward is formed on upper and lower surfaces of ends of the protruding insertion portions.

In a still yet further embodiment, each of the extending portions may be widened along an inclined slope on the upper and lower surfaces of an end of the protruding insertion portion toward the upper and lower sides. A sum of angles by which the extending portion is widened on the upper and lower surfaces of the protruding insertion portion toward the upper and lower sides may be within the range of 3 to 10 degrees.

In a still yet further embodiment, the friction part includes a vent portion connecting fluidly the coupling aperture to outside of the brake assembly and classified into an upper part and a lower part with respect to the vent portion. The upper part and the lower part may be configured to protrude convexly in a curvature toward an inner surface of the vent portion.

In a still yet further embodiment, the protrusions and the recessed portions are formed via a cast bonding process so that the protrusions are formed as a single continuous part.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
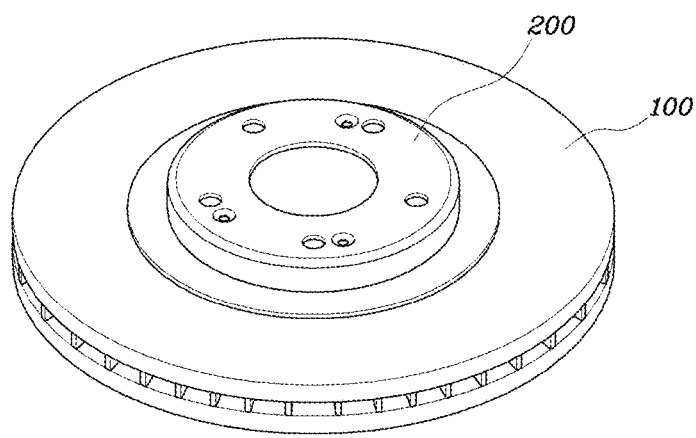
FIG. 1 is a perspective view of a brake disk according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a brake disk according to an exemplary embodiment of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is a perspective view of a brake disk according to an exemplary embodiment of the present invention. The present invention includes a friction part/surface 100 which includes a coupling aperture 120 within a center thereof and a plurality of recessed portions 140 repeatedly formed at a predetermined interval along an inner circumference of the coupling aperture 120, in which bevels or angular surfaces 142 protrude from of the inner surfaces of the recessed portions 140, respectively. In particular, these bevels may be tapered along upper and lower sides thereof toward protruding centers thereof. The brake disk also includes a hub 200 which has a plurality of protrusions 220 inserted into and attached to the recessed portions 140 when coupled within the coupling aperture 120 of the friction part 100 through a cast-bonding method, along a circumference thereof.

Figure 2:
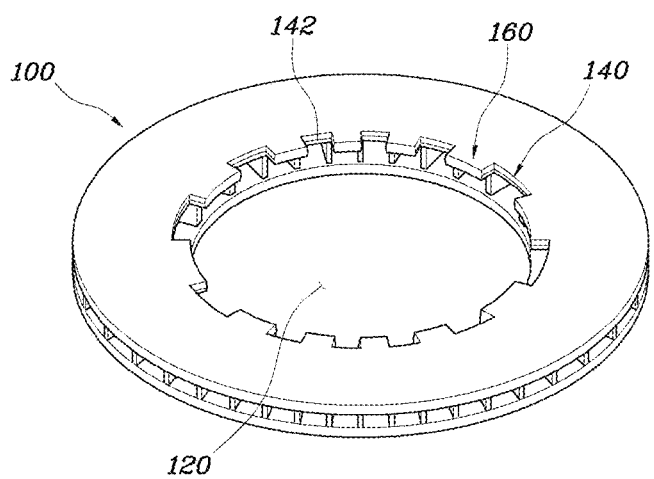
FIG. 2 is a perspective view illustrating a friction part of the brake disk illustrated in FIG. 1.

As can be seen in FIG. 2, in the present invention having the above-described structure, the hub 200 may be completely fixed and coupled to the recessed portions 140 of the friction part 100 through a cast-bonding method, by repeatedly forming the plurality of recessed portions 140 at a predetermined interval in saw-tooth shapes along an inner circumference of the coupling aperture 120 of the friction part 100. Further, the bevels 142 protruding from the recessed surfaces and inner side surfaces (i.e., the inner surfaces) of the recessed portions 140 formed in the friction part 100 toward the recessed spaces are formed therein. These bevels 142 are formed to be tapered along the upper and lower sides thereof toward the protruding centers.

Figure 3:
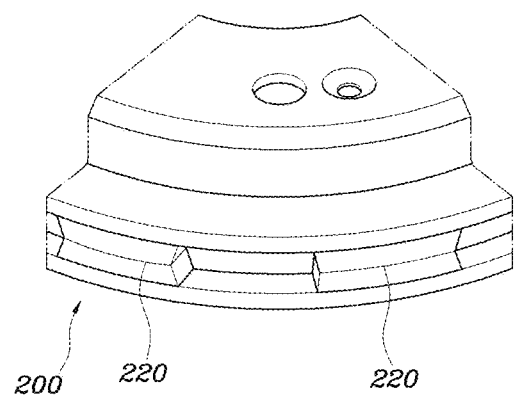
FIG. 3 is a view illustrating protrusions formed in a hub of the brake disk illustrated in FIG. 1.
Figure 4:
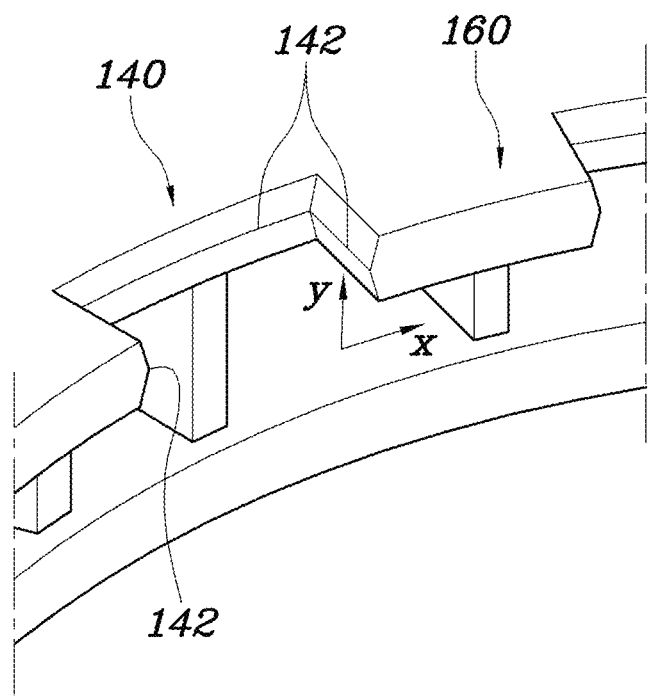
FIG. 4 is a view illustrating recessed portions formed in the friction part of the brake disk illustrated in FIG. 1.

That is, the plurality of protrusions 220 of the hub 200 illustrated in FIG. 3 and the recessed portions 140 of the friction part 100 illustrated in FIG. 4 are attached to each other in the exemplary embodiment of the present invention through a cast-bonding method to surface-contact each other, thereby completely fastening and fixing the friction part 100 and the hub 200 together. Accordingly, since the friction part 100 and the hub 200 are completely coupled to each other in a bonded structure, a stable structure capable of preventing a gap from being generated between the hub an the friction part due braking torque is provided.

Meanwhile, the tapered portions at the upper and lower sides of the bevels 142 may, for example, form an angle of not more than 10 degrees but greater than 0 degrees along the y axis, respectively. FIG. 4 is a view illustrating recessed portions formed in the friction part of the brake disk illustrated in FIG. 1. In the present invention, the bevels 142 may be formed in the recessed portions 140 formed in the friction part 100 in a tapered manner along upper and lower sides thereof toward the protruding centers, and the angles of the bevels tapered at the upper and lower sides thereof may be not more than 10 degrees but greater than 0. When the taper angles of the bevels 142 are excessive, stresses generated by road surface vibration and braking torque may be concentrated along the tapered portions of the bevels 142, breaking the bevels 142. Accordingly, it is preferable that the angles of the upper and lower sides of the tapers along the y axis be not more than 10 degrees but greater than 0 degrees.

Figure 5:
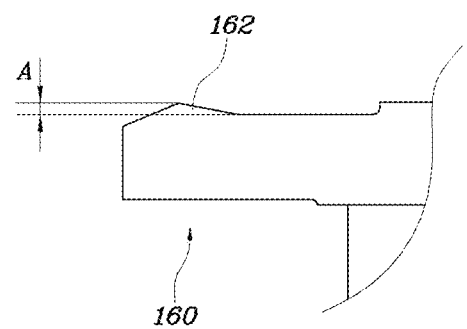
FIG. 5 is a view illustrating protruding insertion portions formed in the friction part of the brake disk illustrated in FIG. 1.

FIG. 5 is a view illustrating protruding insertion portions 160 of the brake disk (i.e., a rotor) illustrated in FIG. 1. Insertion portions 160 protruding between the plurality of recessed portions 140 are repeatedly formed at an inner circumference of the coupling aperture 120, and steps or terraces 162 are formed on upper or lower surfaces of the protruding insertion portions 160. In some exemplary embodiments, the steps 162 may have a height deviation of not more than 1 mm but greater than 0 mm from the originating surface.

Figure 6:
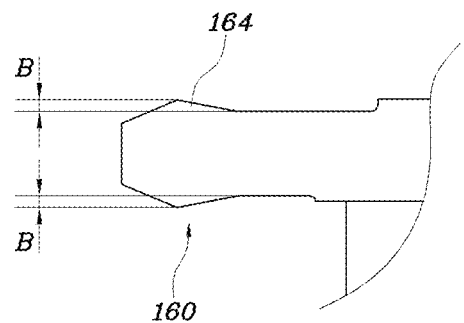
FIG. 6 is a view illustrating protruding insertion portions formed in the friction part of the brake disk illustrated in FIG. 1.

FIG. 6 is a view illustrating protruding insertion portions 160 of the brake disk illustrated in FIG. 1. Insertion portions 160 protruding between the plurality of recessed portions 140 may be repeatedly formed at an inner circumference of the coupling aperture 120, and steps or terraces 164 may be formed along upper and lower surfaces of the protruding insertion portions 160. A sum B of heights of the two steps/terraces 164 formed on the upper and lower surfaces of each of the protruding insertion portions 160 should not be more than 1 mm but should be greater than 0.

In detail, FIG. 2 is a perspective view illustrating a friction part 100 of the brake disk illustrated in FIG. 1. Here, it can be seen that the friction part 100 is formed to have a saw tooth shape by repeatedly forming the plurality of recessed portions 140 and the protruding insertion portions 160 along an inner circumference of the coupling aperture 120. Through the structure, the hub can be coupled to the recessed portions 140 formed in the friction part 140 and the protruding insertion portions 160 through a cast-bonding method to form a single continuous structure.

Further, steps/terraces 162 and 164 are formed in the protruding insertion portions 160 formed in the friction part 100 to further improve a coupling force of the friction part 100 and the hub 200. Accordingly, when the steps/terraces 162 are formed in the protruding insertion portions 160 of the friction part 100, the hub 200 is applied while surrounding the steps/terraces 162 and 164 of the protruding insertion portions 160 of the friction part 100 to further improve the coupling force therebetween when the friction part 100 and the hub 200 are coupled to each other via a cast-bonding method, and the steps/terraces 162 and 164 support a braking load, thereby forming a stable structure. Due to this impending structure, the present invention can minimize formation of a gap between the friction part 100 and the hub 200, and can prevent the friction part 100 and the hub 200 from being broken due to concentrated stress from road surface vibration and braking torques.

Here, the steps/terraces 162 formed on the upper and lower surfaces of the protruding insertion portion 160 should not be more than 1 mm but greater than 0 mm. It is preferable that when the steps/terraces 164 are formed on the upper and lower surfaces of the protruding insertion portions 160, the sum of heights of two steps/terraces formed on the upper and lower surfaces of each of the protruding insertion portions (160) should not be more than 1 mm but greater than 0 mm. This is because when the heights of the steps/terraces 162 and 164 are excessively large, the steps/terraces 162 and 164 may break due to stress concentrations generated via braking torques, and a durability of the coupling portion of the friction part 100 and the hub 200 may become degraded.

Thus, it is preferable that the steps/terraces 162 are formed on the upper or lower surfaces of the protruding insertion portions 160 of the friction part 100 or the steps/terraces 164 are formed on the upper and lower surfaces of the protruding insertion portions 160, and a total height of all of the steps 162 and 164 is not more than 1 mm, and thus generation of a gap between the friction part 100 and the hub 200 is minimized and breakage due to stress concentrations during braking is reduced.

Figure 7:
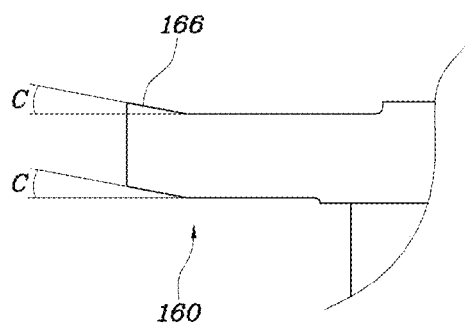
FIG. 7 is a view illustrating protruding insertion portions formed in the friction part of the brake disk illustrated in FIG. 1.

Meanwhile, as another exemplary embodiment for improving a coupling force of the friction part 100 and the hub 200, FIG. 7 illustrates the protruding insertion portions 160 of the brake disk illustrated in FIG. 1. Insertion portions 160 protruding between the plurality of recessed portions 140 may be repeatedly formed at an inner circumference of the coupling aperture 120, and ends of the protruding insertion portions 160 may be bent toward upper or lower sides to form bending portions 166. Then, the bending portions 166 may be formed to be bent at an angle C between 3 to 10 degrees.

Figure 8:
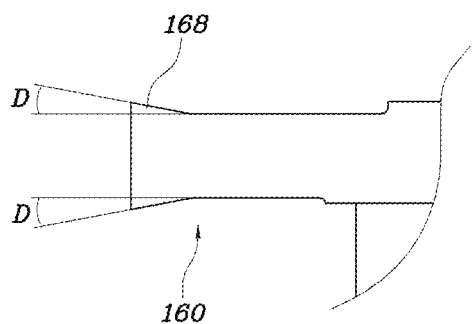
FIG. 8 is a view illustrating protruding insertion portions formed in the friction part of the brake disk illustrated in FIG. 1.

Further, FIG. 8 is a view illustrating the protruding insertion portions 160 of the brake disk illustrated in FIG. 1, and each of extending portions 168 protruding upward and downward may be formed along upper and lower surfaces of ends of the protruding insertion portions 160. Here, each of the extending portions 168 is widened along an inclined plane along the upper and lower surfaces of an end of the protruding insertion portion 160 toward the upper and lower sides thereof. Further, a sum D of angles by which the extending portion 168 is widened on the upper and lower surfaces of the protruding insertion portion 160 toward the upper and lower sides may range from 3 to 10 degrees.

Accordingly, when the bending portions 166 or the extending portions 168 are formed in the protruding insertion portions 160 of the friction part 100, the friction part 100 and the hub 200 may be even more securely coupled through a cast-bonding method to improve a coupling force and support a braking load, preventing formation of a gap between the friction part 100 and the hub 200 and preventing the friction part 100 and the hub 200 from being broken due to stress concentrations from road surface vibration and braking torques generated during operation of the vehicle.

Furthermore, in some exemplary embodiments, it may be preferable that the bending portions 166 formed along the upper or lower surfaces of the protruding insertion portions 160 be formed to have an angle C which is between 3 to 10 degrees, and a sum D of the angels of the two steps/terraces of each of the extending portions formed in the protruding insertion portions 160 be between 3 to 10 degrees combined. If the heights of the bending portions 166 or the extending portions 168 formed in the protruding insertion portions 160 are to large, the bending portions 166 or the extending portions 168 may break due to stress concentration generated due to braking torques, and the durability of the coupling portion of the friction part 100 and the hub 200 may become degraded.

Thus, the structural stability and a durable lifespan can be secured by applying the steps/terraces 162 and 164, the bending portions 166, or the extending portions 168 to the protruding insertion portions 160, and the friction part 100 and the hub 200 can be more securely coupled into a contiguous part. Here, the steps 162 and 164, the bending portions 166, and the extending portions 168 formed in the protruding insertion portions 160 may be selectively applied according to a machining method and a manufacturing method.

Figure 9:
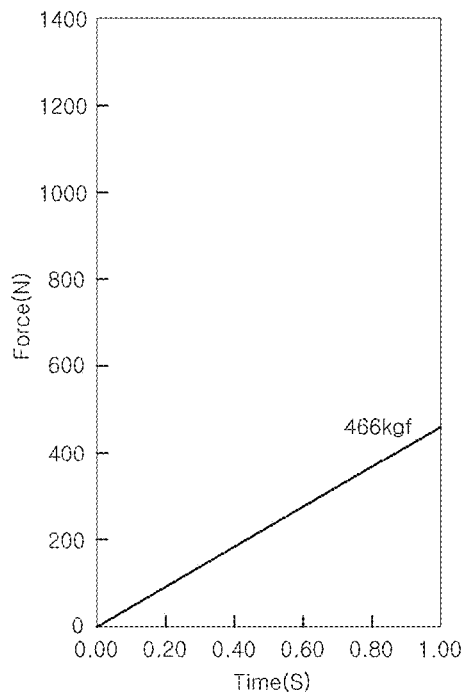
FIG. 9 is a graph illustrating a coupling force of a brake disk according to a conventional design.
Figure 10:
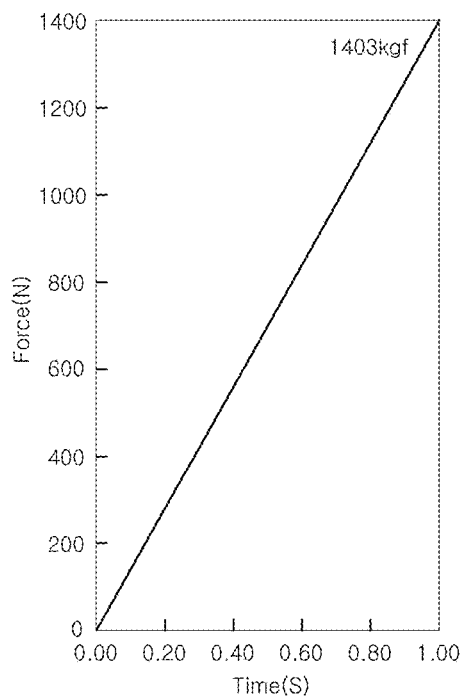
FIG. 10 is a graph illustrating a coupling force of the brake disk illustrated in FIG. 1.

FIG. 9 is a graph illustrating a coupling force of a brake disk according to the related art, and FIG. 10 is a graph illustrating a coupling force of the brake disk illustrated in FIG. 1. The effects of the present invention will be described through the above-described structure.

The graphs of FIGS. 9 and 10 are obtained by measuring and analyzing a coupling force of the friction part 100 and the hub 200 of the brake disk, and show that a gap is formed between the protruding insertion portions 160 of the friction part 100 and the hub 200 when a force is applied for one second in the coupling portion where the insertion portions 160 of the friction part 100 and the hub 200 are coupled to each other.

As can be seen from FIG. 9, in the brake disk according to the related art, when a force of approximately 460 N is applied to the coupling portion, a gap is formed between the protruding insertion portions 160 of the friction part 100 and the hub 200. Meanwhile, referring to FIG. 10, in the brake disk of the present invention, a gap is formed between the protruding insertion portions 160 of the friction part 100 and the hub 200 when a force of approximately 1400 N is applied to the coupling portion. Consequently, it can be ascertained that the coupling force of the brake disk of the exemplary present invention has been improved by approximately 1000 N as compared the brake disk according to the related art. That is, the brake disk of the present invention significantly improves a coupling force between the friction part 100 and the hub 200 as compared with the brake disk according to the related art, thereby achieving a structural stability and sufficiently securing durability of the brake disk.

Meanwhile, in describing a structure of a vent portion of the present invention through a frictional heat distribution drawing, the friction part 100 includes a vent portion 102 connecting fluidly from the coupling aperture 120 to outside the brake disk structure and is classified into an upper part 104 and a lower part 106 with respect to the vent portion 102. More specifically, the upper part 104 and the lower part 106 convexly protrude to curve toward an inner side of the vent portion 102.

Figure 11:
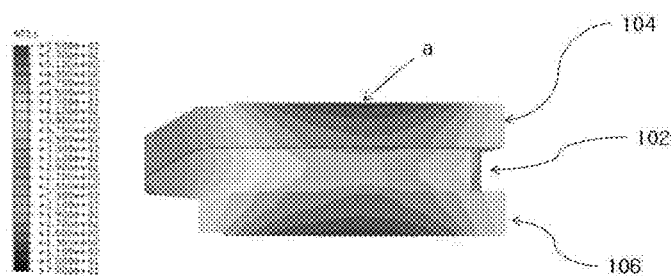
FIG. 11 is a view illustrating distribution of heat due to frictional heat of the brake disk according to the conventional design.
Figure 12:
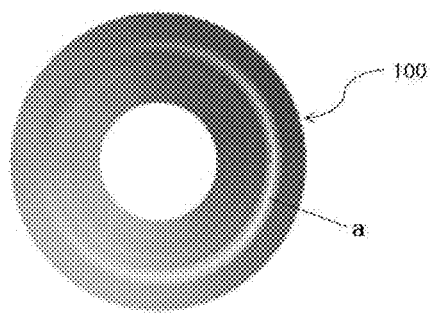
FIG. 12 is a view illustrating a friction part of the brake disk according to the conventional design.

FIG. 11 is a view illustrating distribution of heat resulting from frictional heat along the surface of the brake disk according to the related art. As can be seen from FIG. 11, the frictional heat is locally distributed within a center portion a of the friction surface in the brake disk according to the related art. Due to this, as can be seen in FIG. 12, a local thermal expansion is generated in the friction part 100 at a center a of the friction surface thereof.

Figure 13:
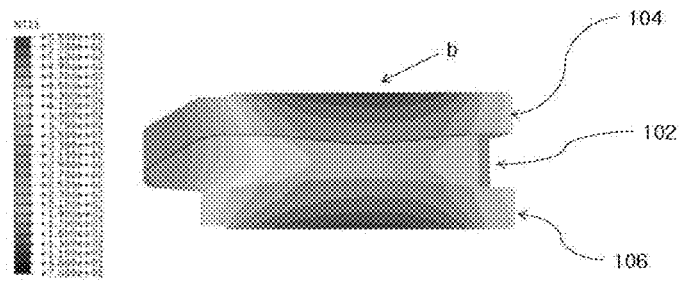
FIG. 13 is a view illustrating distribution of heat due to frictional heat of the brake disk illustrated in FIG. 1.
Figure 14:
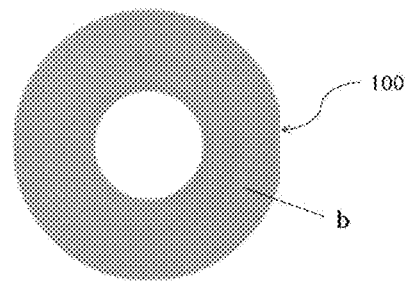
FIG. 14 is a view illustrating the friction part of the brake disk illustrated in FIG. 1.

Meanwhile, as can be seen in FIG. 13, as the upper part 104 and the lower part 106 protrude convexly along a curvature toward the inner side of the vent portion 102, frictional heat generated at the center b of the friction surfaces of the upper part 104 and the lower part 106 is reduced or minimized. Due to this, as can be seen in FIG. 14, a concentration of local frictional heat is prevented at a center b of the friction surface of the friction part 100, making it possible to control and minimize generation of a thermal expansion.

That is, the friction part 100 of the present invention disperses frictional heat which would normally be concentrated in or around a center of the friction surface to control a local thermal expansion due to frictional heat through a structure where the upper part 104 and the lower part 106 convexly protrude about the vent portion 102.

Additionally, the protrusions 220 of the hub 200 may be cast-bonded to be filled in the recessed spaces formed by the recessed portions 140 of the friction part 100 so that the protrusions 220 and the recessed portions 140 are contiguously coupled to each other via surface-to-surface contact.

That is, the recessed space defined by the recessed portions 140 formed in the friction part 100 may receive the protrusions 220 of the hub 200 via casting to couple and fix the friction part 100 and the hub 200 as one contiguously part. In particular, the recessed portions 140 of the friction part 100 and the protrusions 220 of the hub 200 can be fixed in a wedge form to be coupled more firmly.

In the brake disk having the above-described structure, the friction part and the hub can be contiguously as a single part via a cast-bonding method, by forming the tapered bevels in the recessed portions formed along an inner circumference of the coupling aperture of the friction part. Further, a local thermal expansion occurring in the friction part during a braking operation can be reduced by convexly protruding the upper part and the lower part of the friction part toward an inner side of the bent portion.

While the present invention has been illustrated and described with reference to specific embodiments, it is apparent to those skilled in the art to which the present invention pertains that the present invention may be variously improved and changed without departing from the scope of the present invention.

What is claimed is:

1. A brake disk comprising:
a friction part having a coupling aperture within a center thereof and having a plurality of recessed portions repeatedly formed at a predetermined interval along an inner circumference of the coupling aperture, in which bevels protrude inner side surfaces of the recessed portions, respectively, the bevels tapered along upper and lower sides of the inner side surfaces toward protruding centers thereof; and
a hub having a plurality of protrusions inserted into and attached to the recessed portions when coupled to the coupling aperture of the friction part, along a circumference thereof,
wherein insertion portions protruding between the plurality of recessed portions are repeatedly formed along an inner circumference of the coupling aperture, and terraces are formed on upper or lower surfaces of the protruding insertion portions.

2. The brake disk of claim 1, wherein insertion portions protruding between the plurality of recessed portions are repeatedly formed along an inner circumference of the coupling aperture, and terraces are formed on upper and lower surfaces of the protruding insertion portions.

3. The brake disk of claim 2, wherein a sum of heights of the terraces formed on the upper and lower surfaces of each of the protruding insertion portions is not more than 1 mm but greater than 0 mm.

4. The brake disk of claim 1, wherein the terraces have a height of not more than 1 mm but greater than 0 mm.

5. The brake disk of claim 1, wherein the tapered portions along the upper and lower sides of the bevels form an angle of not more than 10 degrees but greater than 0 degrees along a y axis, respectively.

6. The brake disk of claim 1, wherein the friction part includes a vent portion connecting fluidly from the coupling aperture to outside the brake disk and is divided into an upper part and a lower part with respect to the vent portion, and the upper part and the lower part convexly protrude in a curvature toward an inner side of the vent portion.

7. The brake disk of claim 1, wherein the protrusions of the hub are received in the recessed spaces formed by the recessed portions of the friction part so that the protrusions and the recessed portions are contiguously attached to each other via surface-to surface contact.

8. A brake disk comprising:
a friction part having a coupling aperture within a center thereof and having a plurality of recessed portions repeatedly formed at a predetermined interval along an inner circumference of the coupling aperture, in which bevels protrude from inner side surfaces of the recessed portions, respectively, the bevels tapered along upper and lower sides of the inner side surfaces toward protruding centers thereof; and
a hub having a plurality of protrusions inserted into and attached to the recessed portions when coupled to the coupling aperture of the friction part, along a circumference thereof,
wherein insertion portions protruding between the plurality of recessed portions are repeatedly formed along an inner circumference of the coupling aperture, and extending portions protruding upward and downward are formed on upper and lower surfaces of ends of the protruding insertion portions.

9. The brake disk of claim 8, wherein each of the extending portions is widened along an inclined plane on the upper and lower surfaces of an end of the protruding insertion portion toward the upper and lower sides of the protruding insertion portion.

10. The brake disk of claim 9, wherein a sum of angles by which the extending portion is widened on the upper and lower surfaces of the protruding insertion portion toward the upper and lower sides is between 3 to 10 degrees.

11. A brake disk comprising:
   a friction part having a coupling aperture within a center thereof and having a plurality of recessed portions repeatedly formed at a predetermined interval along an inner circumference of the coupling aperture, in which bevels protrude inner side surfaces of the recessed portions, respectively, the bevels tapered along upper and lower sides of the inner side surfaces toward protruding centers thereof; and
   a hub having a plurality of protrusions inserted into and attached to the recessed portions when coupled to the coupling aperture of the friction part, along a circumference thereof,
   wherein insertion portions protruding between the plurality of recessed portions are repeatedly formed along an inner circumference of the coupling aperture, and ends of the protruding insertion portions are bent toward upper or lower sides of each protruding insertion portion to form bending portions therein.

12. The brake disk of claim 11, wherein the bending portions are bent at an angle between 3 to 10 degrees.

* * * * *